United States Patent
Miyatake et al.

(10) Patent No.: US 11,473,714 B2
(45) Date of Patent: Oct. 18, 2022

(54) STRIP MEMBER FOR SPIRAL PIPE AND REHABILITATION METHOD OF EXISTING PIPE

(71) Applicant: SEKISUI CHEMICAL CO., LTD., Osaka (JP)

(72) Inventors: Yuuta Miyatake, Rittou (JP); Hiroshi Sugahara, Rittou (JP); Tatsurou Baba, Rittou (JP); Yoshirou Sugiyama, Rittou (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 231 days.

(21) Appl. No.: 16/485,231

(22) PCT Filed: Feb. 27, 2018

(86) PCT No.: PCT/JP2018/007311
§ 371 (c)(1),
(2) Date: Aug. 12, 2019

(87) PCT Pub. No.: WO2018/159627
PCT Pub. Date: Sep. 7, 2018

(65) Prior Publication Data
US 2019/0368646 A1  Dec. 5, 2019

(30) Foreign Application Priority Data
Mar. 1, 2017  (JP) .............................. JP2017-038490

(51) Int. Cl.
*F16L 55/16*  (2006.01)
*F16L 55/165*  (2006.01)
*B29C 63/32*  (2006.01)

(52) U.S. Cl.
CPC .......... *F16L 55/1655* (2013.01); *B29C 63/32* (2013.01)

(58) Field of Classification Search
CPC .............................. F16L 55/1655; B29C 63/32
(Continued)

(56) References Cited

U.S. PATENT DOCUMENTS 4,995,929 A * 2/1991 Menzel ................... B29C 65/58
156/391
5,074,943 A * 12/1991 Menzel ................... B29C 65/76
156/195

(Continued)

FOREIGN PATENT DOCUMENTS

EP    2 919 967    9/2015
JP    6-143420     5/1994
(Continued)

OTHER PUBLICATIONS

International Search Report dated Apr. 10, 2018 in International (PCT) Application No. PCT/JP2018/007311.

(Continued)

*Primary Examiner* — James F Hook
(74) *Attorney, Agent, or Firm* — Wenderoth, Lind & Ponack, L.L.P.

(57) ABSTRACT

A strip member that can be made into a spiral pipe with an enlarged perimeter by being spirally wound. A first fitting portion (93) is disposed in one end portion of a cross-section orthogonal to an extending direction of a strip member (90) and a second fitting portion (94) is disposed in the other end portion of the cross-section. A spiral pipe (9) is made by spirally winding the strip member (90) and fitting the second fitting portion (94) with the first fitting portion (93) preceding by one turn. The strip member (90) has a cross-sectional configuration in which a reference width direction $W_9$ connecting the first fitting portion (93) and the second fitting (Continued)

portion (94) on the cross-section is inclinable to an outer surface side toward the first fitting portion side when the strip member is wound.

7 Claims, 9 Drawing Sheets

(58) Field of Classification Search
USPC ......... 138/97, 98, 150, 129, 154; 405/150.1, 405/184.2
See application file for complete search history.

(56) References Cited

U.S. PATENT DOCUMENTS

| | | | | |
|---|---|---|---|---|
| 5,101,863 | A * | 4/1992 | Fujii | F16L 55/1655 138/154 |
| 5,595,800 | A * | 1/1997 | Menzel | F16L 9/16 428/36.3 |
| 6,168,846 | B1 * | 1/2001 | Molyneux | E03F 3/06 428/92 |
| 10,316,994 | B2 * | 6/2019 | Weaver | F16L 55/1655 |
| 2004/0094222 | A1 * | 5/2004 | Bateman | F16L 11/16 138/129 |
| 2005/0106347 | A1 * | 5/2005 | Wilson | F16L 11/16 428/36.9 |
| 2007/0275195 | A1 * | 11/2007 | Simonsohn | B29C 66/49 428/36.9 |
| 2009/0133771 | A1 * | 5/2009 | He | B29C 48/12 138/129 |
| 2010/0008731 | A1 | 1/2010 | Kakine et al. | |
| 2010/0132824 | A1 * | 6/2010 | Melville | F16L 11/16 264/177.17 |
| 2010/0180973 | A1 | 7/2010 | Ohira et al. | |
| 2013/0252794 | A1 * | 9/2013 | Yamasaki | F16L 55/18 493/299 |
| 2014/0190585 | A1 * | 7/2014 | Weaver | B29C 53/78 138/98 |
| 2018/0038541 | A1 | 2/2018 | Sugahara et al. | |

FOREIGN PATENT DOCUMENTS

| | | |
|---|---|---|
| JP | 08-233161 | 9/1996 |
| JP | 11-34166 | 2/1999 |
| JP | 2000-96996 | 4/2000 |
| JP | 2014-054741 | 3/2014 |
| JP | 2014-065170 | 4/2014 |
| JP | 2016-125608 | 7/2016 |
| WO | 2008/050750 | 5/2008 |
| WO | 2008/075681 | 6/2008 |
| WO | 2014/066934 | 5/2014 |
| WO | 2016/175243 | 11/2016 |

OTHER PUBLICATIONS

International Preliminary Report on Patentability and Written Opinion of the International Searching Authority dated Sep. 3, 2019 in International (PCT) Application No. PCT/JP2018/007311.
Extended European Search Report dated Nov. 4, 2020 in counterpart European Patent Application No. 18761135.5.
Office Action dated Oct. 26, 2021 in corresponding Japanese Patent Application No. 2018-035767, 8 pages.

* cited by examiner

STRIP MEMBER FOR SPIRAL PIPE AND REHABILITATION METHOD OF EXISTING PIPE

FIELD OF THE INVENTION

The present invention relates to a strip member to be made into a spiral pipe and a rehabilitation method of an existing pipe. The present invention particularly relates to a strip member made into a pipe by being spirally wound and having edge portions of adjacent turns fitted with each other and to a rehabilitation method of an existing pipe using the strip member.

BACKGROUND ART

In recent years, measures to cope with aging of existing pipes such as sewage pipes are called for. As one example of such measures, a construction method of rehabilitating an existing pipe by lining a rehabilitation pipe in an inner periphery of the existing pipe is known (Refer to Patent Documents 1 to 3, for example). The rehabilitation pipe is a spiral pipe made of a strip member, for example.

In general, a strip member includes a flat strip portion, a plurality of ribs, a female fitting portion and a male fitting portion. The ribs are protruded from the flat strip portion toward an outer surface side. The female fitting portion is disposed in one end portion of the flat strip portion in a width direction. The male fitting portion is disposed in the other end portion of the flat strip portion in the width direction.

The strip member is spirally wound with the female fitting portion oriented to an extension front and the male fitting portion oriented to an extension rear. And the male fitting portion of a not-yet-made-into-the-pipe portion is fitted with the female fitting portion of a made-into-the-pipe portion that is made into the pipe in the preceding turn. Thereby, the spiral pipe is gradually extended.

Conventional strip members have a property to have a perimeter of the spiral pipe reduced as pipe-making proceeds. This property is referred to as a "perimeter reducing property" hereinafter. The perimeter reducing property includes a diameter reducing property that works to reduce a diameter of a spiral pipe with a circular cross-section. Therefore, to prevent a reduction of perimeter (reduction of diameter) of the spiral pipe, the pipe-making apparatus is provided with an annular inner periphery limiter called a link roller for winding the strip member therearound for pipe-making (Refer to Patent Documents 1 to 3).

To the contrary, a property to have a perimeter of a spiral pipe enlarged as pipe-making proceeds is referred to as a "perimeter enlarging property". The perimeter enlarging property includes a diameter enlarging property that enlarges a diameter of a spiral pipe with a circular cross-section.

PRIOR ART DOCUMENTS

Patent Documents

Patent Document 1: Japanese Patent Application Publication No. 2014-065170
Patent Document 2: International Patent Application Publication No. WO2008/075681
Patent Document 3: International Patent Application Publication No. WO2016/175243 ([0004])

SUMMARY OF THE INVENTION

Problem to be Solved by the Invention

When a strip member is wound around an inner periphery limiter for pipe-making, the strip member is spaced from an inner peripheral surface of an existing pipe, which leads to a considerable loss of a flow passage cross-sectional area. Moreover, since a cross-sectional configuration and a diameter dimension of a spiral pipe are determined by the inner periphery limiter, it is difficult to cope with portions of the existing pipe with varying bore or varying cross-sectional configuration or portions with a step or the like.

In view of the above, it is an object of the present invention to provide a strip member that can be made into a pipe with enlarged perimeter (enlarged diameter) by providing a perimeter enlarging property when spirally winding the strip member to make it into a spiral pipe.

Solution to the Problem

The inventors of the present invention worked hard to solve the problems mentioned above.

In a conventional strip member, due to a male-female fitting structure of a male fitting portion and a female fitting portion, a cross-sectional area per unit width on the female fitting portion side is greater than a cross-sectional area per unit width on the male fitting portion side (Refer to FIGS. 1 and 24 of Patent Document 2 or the like). Therefore, a neutral weak axis of a cross-section orthogonal to an extending direction of the strip member is inclined to an outer surface side in a direction from the male fitting portion to the female fitting portion. The term "neutral weak axis" used herein refers to, of two orthogonal neutral axes on the cross-section, the one where a moment of inertia of area is the smaller. During pipe-making, the neutral weak axis is moved to be parallel to a pipe axis of a spiral pipe, and therefore, the female fitting portion side (extension forward side of the spiral pipe) of the strip member is inclined to an inner surface side compared with the male fitting portion side. It is considered that this is a mechanism of reduction of perimeter (reduction of diameter) of the conventional spiral pipe.

Based on the consideration and knowledge mentioned above, the present invention provides a strip member to be a spiral pipe by being spirally wound, the strip member including: a first fitting portion disposed in one end portion of a cross-section orthogonal to an extending direction; and a second fitting portion disposed in the other end portion of the cross-section, the second fitting portion to be fitted with the first fitting portion preceding by one turn, wherein the strip member has a cross-sectional configuration in which a reference width direction connecting the first fitting portion and the second fitting portion on the cross-section is inclinable to an outer surface side toward the first fitting portion side when the strip member is wound.

The cross-sectional configuration mentioned above refers to the cross-sectional configuration in a state where the strip member is not curved (zero curvature).

According to the strip member, the spiral pipe can be provided with a perimeter enlarging property. That is, the spiral pipe is given a property to have a perimeter thereof enlarged as the pipe-making proceeds. Without an outer periphery limiter such as an existing pipe, the perimeter of the spiral pipe can be enlarged as the pipe-making proceeds. When there is an outer periphery limiter, the pipe-making can proceed in such a manner as to press the spiral pipe against an inner periphery of the outer periphery limiter. Accordingly, in a case where an inner periphery of an existing pipe of a sewage pipe is lined with a spiral pipe, reduction in a flow passage cross-sectional area can be constrained. Even if there is a step or a change in diameter in an inner peripheral surface of the existing pipe, a pipe-making diameter of the spiral pipe can be adjusted accordingly.

The term "reference width direction" used herein refers to a direction connecting a particular position of the first fitting portion and a position of the second fitting portion corresponding to the particular position (position where the particular position is located when being fitted).

Preferably, a neutral weak axis of the cross-section is inclined to an inner surface side with respect to the reference width direction toward the first fitting portion side.

Thereby, the spiral pipe can be surely provided with the perimeter enlarging property.

When a curvature is provided in the extending direction of the strip member, a compression stress works on the inner surface side, and a tensile stress works on the outer surface side. A neutral plane where neither the compression stress nor the tensile stress works appears between the inner surface side and the outer surface side. In a strip member having an irregular cross-section, the neutral planes are discontinuously distributed. An approximate straight line of the distribution of the neutral planes on the cross section is defined as the neutral weak axis.

It is only required that the neutral weak axis of the strip member in the non-curved state (zero curvature) should be inclined to the inner surface side with respect to the reference width direction toward the first fitting portion side. More preferably, the neutral weak axis of the strip member both in a curved state and the non-curved state is inclined to the inner surface side with respect to the reference width direction toward the first fitting portion side.

Preferably, a cross-sectional area of the cross-section per unit width is relatively small on the first fitting portion side and relatively large on the second fitting portion side.

Thereby, the neutral weak axis can be surely inclined to the inner surface side with respect to the reference width direction toward the first fitting portion side. Further, the strip member can have the cross-sectional configuration in which the reference width direction is surely inclined to the outer surface side toward the first fitting portion side when the strip member is wound. As a result, the spiral pipe can be surely provided with the perimeter enlarging property. It is particularly effective when the strip member is made of a single material.

Preferably, the strip member further includes: a flat strip portion that is flat; and a plurality of ribs protruded from an outer side surface of the flat strip portion, the ribs spaced from each other in a width direction of the flat strip portion, wherein the first fitting portion is disposed in one end portion of the flat strip portion in the width direction and the second fitting portion is disposed in the other end portion thereof, and the ribs are relatively sparsely disposed on the first fitting portion side and relatively densely disposed on the second fitting portion side.

Thereby, the neutral weak axis can be surely inclined to the inner surface side with respect to the reference width direction toward the first fitting portion side. Further, the strip member can have the cross-sectional configuration in which the reference width direction is surely inclined to the outer surface side toward the first fitting portion side when the strip member is wound. As a result, the spiral pipe can be surely provided with the perimeter enlarging property. It is particularly effective when the strip member is made of a single material.

Preferably, the strip member further includes: a flat strip portion; and a plurality of ribs protruded from an outer side surface of the flat strip portion, the ribs spaced from each other in a width direction of the flat strip portion, wherein the first fitting portion is disposed in one end portion of the flat strip portion in the width direction and the second fitting portion is disposed in the other end portion thereof, and a protruded height of the ribs from the flat strip portion is relatively low on the first fitting portion side and the protruded height of the ribs from the flat strip portion is relatively high on the second fitting portion side.

Thereby, the neutral weak axis can be surely inclined to the inner surface side with respect to the reference width direction toward the first fitting portion side. Further, the strip member can have the cross-sectional configuration in which the reference width direction is surely inclined to the outer surface side toward the first fitting portion side when the strip member is wound. As a result, the spiral pipe can be surely provided with the perimeter enlarging property. It is particularly effective when the strip member is made of a single material.

Preferably, the strip member further includes: one or a plurality of cross-section adjustment members, wherein the neutral weak axis is biased to the inner surface side toward the first fitting portion side compared with when there is no cross-section adjustment member.

The cross-sectional configuration of the strip member can be adjusted by the cross-section adjustment member, and a degree of enlargement of perimeter can be controlled. The neutral weak axis is biased to the inner surface side toward the first fitting portion side compared with when there is no cross-section adjustment member. Thereby, the strip member can have the cross-sectional configuration in which the reference width direction is surely inclined to the outer surface side toward the first fitting portion side when the strip member is wound. Thereby, the spiral pipe can be surely provided with the perimeter enlarging property.

Preferably, the cross-section adjustment member is unevenly disposed or distributed closer to the second fitting portion side. Thereby, the spiral pipe can be surely provided with the perimeter enlarging property.

The cross-section adjustment member may be unevenly disposed or distributed closer to the first fitting portion side.

The cross-section adjustment member may be dedicated to adjustment of the neutral weak axis or the reference width direction. Alternatively, an element that is provided for another function such as reinforcement, obtaining heat, fitting or the like may also serve as the cross-section adjustment member.

Preferably, the cross-section adjustment member is a reinforcement strip material made of steel.

The reinforcement strip material can also serve as the cross-section adjustment member.

The present invention provides a rehabilitation method of an existing pipe, wherein the strip member is spirally wound to form a rehabilitation pipe along an inner surface of the existing pipe.

Advantageous Effects of the Invention

According to the present invention, when the strip member is spirally wound to make a spiral pipe, the spiral pipe can be provided with the perimeter enlarging property. Thereby, the pipe can be made with enlarged perimeter.

BRIEF DESCRIPTION OF THE DRAWINGS

FIG. 3 (b) is a cross-sectional view of the strip member curved with a curvature of the spiral pipe, showing a result of analysis by finite element method.

DESCRIPTION OF THE PREFERRED EMBODIMENTS

Embodiments of the present invention will be described hereinafter with reference to the drawings.

First Embodiment

Figure 1:
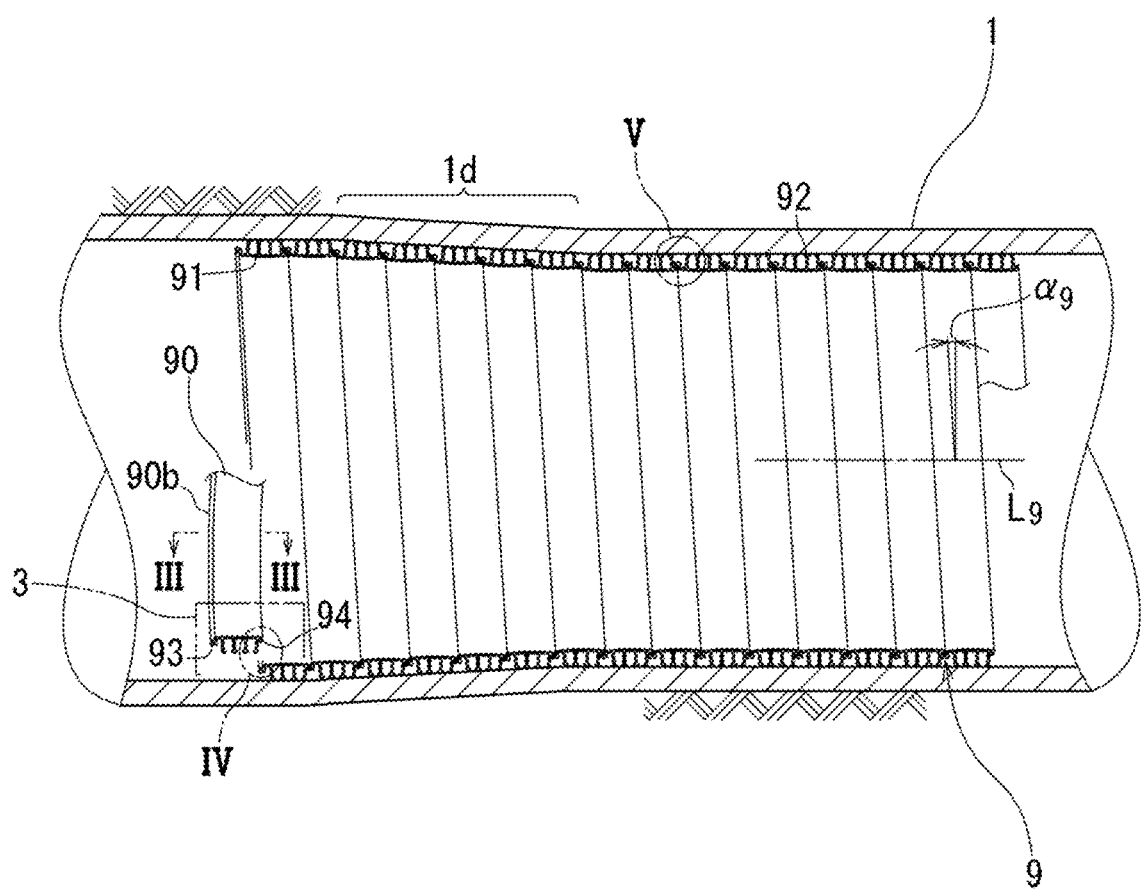
FIG. 1 is a cross-sectional view, showing an existing pipe in a process of being rehabilitated using a strip member according to a first embodiment of the present invention.

As shown in FIG. 1, the first embodiment of the present invention is applied to a rehabilitation of an aged existing pipe 1, for example. The existing pipe 1 may be a sewer pipe, a water supply pipe, a water conduit for hydroelectric power generation, an agricultural water pipe, a gas pipe, or the like.

The existing pipe 1 may not have a constant cross-section throughout an entire length, and a cross-section changed portion 1*d* having a step or a varying inner diameter may exist.

Figure 2:
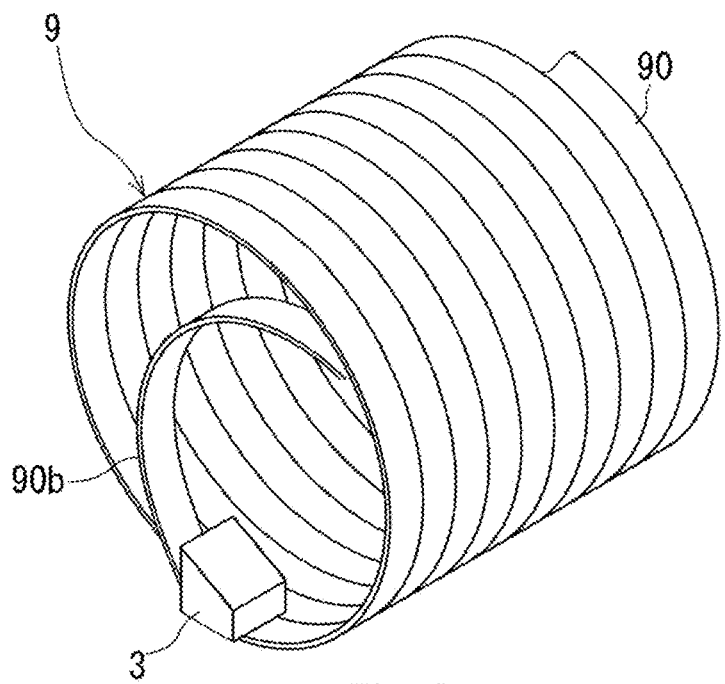
FIG. 2 is a perspective view, showing a spiral pipe (rehabilitation pipe) in a process of being made from the strip member.

A lining of a spiral pipe 9 (rehabilitation pipe) is provided on an inner wall of the existing pipe 1. The spiral pipe 9 is made of an elongated strip member 90. As shown in FIG. 2, the spiral pipe 9 is made by spirally winding the strip member 90 and joining edge portions of the strip member 90 of adjacent turns. The spiral pipe 9 has a circular cross-sectional configuration. The cross sectional configuration is not limited to circular, but may be non-circular such as quadrangular.

As shown in FIG. 3 (*a*), the strip member 90 before being made into the spiral pipe 9 has a constant cross sectional configuration and extends in a direction orthogonal to the plane of FIG. 3 (*a*). The strip member 90 is made of a synthetic resin material such as polyvinyl chloride. The strip member 90 having the constant cross section is formed by extrusion molding the resin material.

The strip member 90 integrally has a flat strip portion 91, a plurality of ribs 92, a first fitting portion 93 (female fitting portion) and a second fitting portion 94 (male fitting portion). An inner surface of the flat strip portion 91 (surface to be an inner peripheral surface of the spiral pipe 9, under surface in FIG. 3 (*a*)) is flat.

A plurality of (4 in this embodiment) ribs 92 are protruded from the flat strip portion 91 toward an outer surface side (upward in FIG. 3 (*a*)). The ribs 92 are disposed spaced from each other in a width direction of the flat strip portion 91.

The first fitting portion 93 is disposed in one end portion (left in FIG. 3(*a*)) of a cross-section of the strip member 90 orthogonal to an extending direction of the strip member 90. The second fitting portion 94 is disposed in the other end portion (right in FIG. 3(*a*)) of the cross-section.

Specifically, the first fitting portion 93 integrally continues from a side of one end portion (left end portion in FIG. 3(*a*)) of the flat strip portion 91 in the width direction. A fitting groove 93*a* is formed in the first fitting portion 93. The fitting groove 93*a* is open to an inner surface side (downward in FIG. 3 (*a*)) of the strip member 90.

The second fitting portion 94 is integrally formed in an outer surface on the other end side (right side in FIG. 3(*a*)) of the flat strip portion 91 in the width direction. The second fitting portion 94 has a fitting protrusion 94*b*. The fitting protrusion 94*b* is protruded from the flat strip portion 91 to the outer surface side (upward in FIG. 3 (*a*)).

A cross-sectional area of the first fitting portion 93 is greater than a cross-sectional area of the second fitting portion 94. In other words, a volume of the first fitting portion 93 per unit length of the strip member 90 is greater than a volume of the second fitting portion 94 per unit length of the strip member 90.

On the other hand, a distance from the first fitting portion 93 to the nearest rib 92A is relatively long and the distance from the second fitting portion 94 to the nearest rib 92B is relatively short. Or the rib 92B integrally continues from the second fitting portion 94. Therefore, the ribs 92 are distributed more heavily on the second fitting portion 94 side. That is, an existing probability of the ribs 92 per unit width of the strip member 90 is relatively low on the first fitting portion 93 side and relatively high on the second fitting portion 94 side.

Looking at an overall cross-section of the strip member 90, the uneven distribution of the ribs 92 heavier on the second fitting portion 94 side outweighs a difference between the cross-sectional areas of the fitting portions 93, 94, and a cross-sectional area per unit width is relatively small on the first fitting portion 93 side and relatively large on the second fitting portion 94 side.

Figure 4:
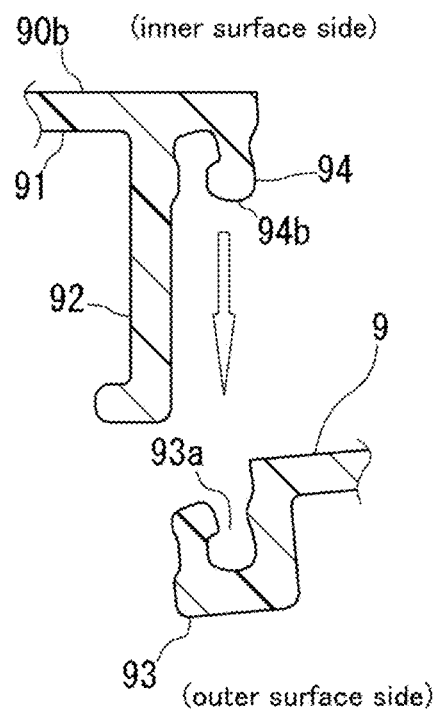
FIG. 4 is an enlarged cross-sectional view of a circled portion IV of FIG. 1.
Figure 5:
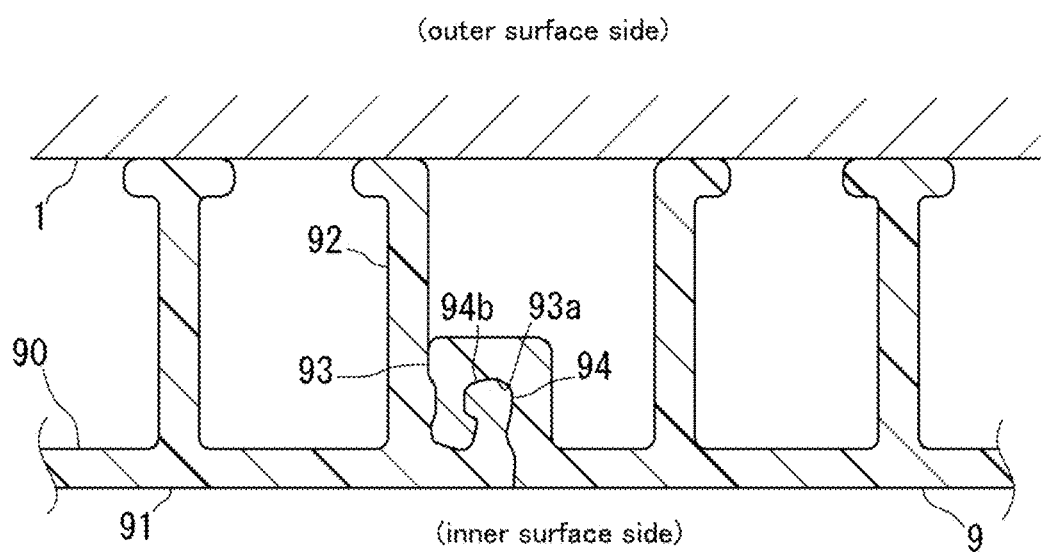
FIG. 5 is an enlarged cross-sectional view of a circled portion V of FIG. 1.

As shown in FIGS. 4 and 5, in the spiral pipe 9, the fitting protrusion 94*b* is fitted in the fitting groove 93*a* preceding by one turn. Further, the second fitting portion 94 is fitted with the first fitting portion 93 preceding by one turn.

As shown in FIGS. 1 and 2, the fitting, and further the pipe-making is performed with a pipe-making apparatus 3. By activation of the pipe-making apparatus 3, a not-yetmade-into-the-pipe portion 90b of the strip member 90 is sequentially wound into a spiral configuration and introduced to a precedingly-made-into-the-pipe portion of the strip member 90, i. e., a front end portion of the spiral pipe 9 in an extending direction. At this time, the first fitting portion 93 of the not-yet-made-into-the-pipe portion 90b is oriented forward in the extending direction (leftward in FIG. 1) and the second fitting portion 94 thereof is oriented rearward in the extending direction (rightward in FIG. 1). As shown in FIG. 4, the second fitting portion 94 of the not-yet-made-into-the-pipe portion 90b is fitted with the first fitting portion 93 that is precedingly made into the pipe by one turn. The second fitting portion 94 is fitted into the first fitting portion 93 from the inner surface side (inside in a radial direction of the spiral pipe 9, above in FIG. 4). The pipe-making apparatus 3 may fit the second fitting portion 94 of the not-yet-made-into-the-pipe portion 90b into the first fitting portion 93 that is already made into the pipe by pressing the second fitting portion 94 into the first fitting portion 93 or alternatively by holding the first fitting portion 93 and the second fitting portion 94 tightly together.

The self-propelled pipe-making apparatus disclosed in Patent Document 3 may be used as the pipe-making apparatus 3, for example.

Figure 3A:
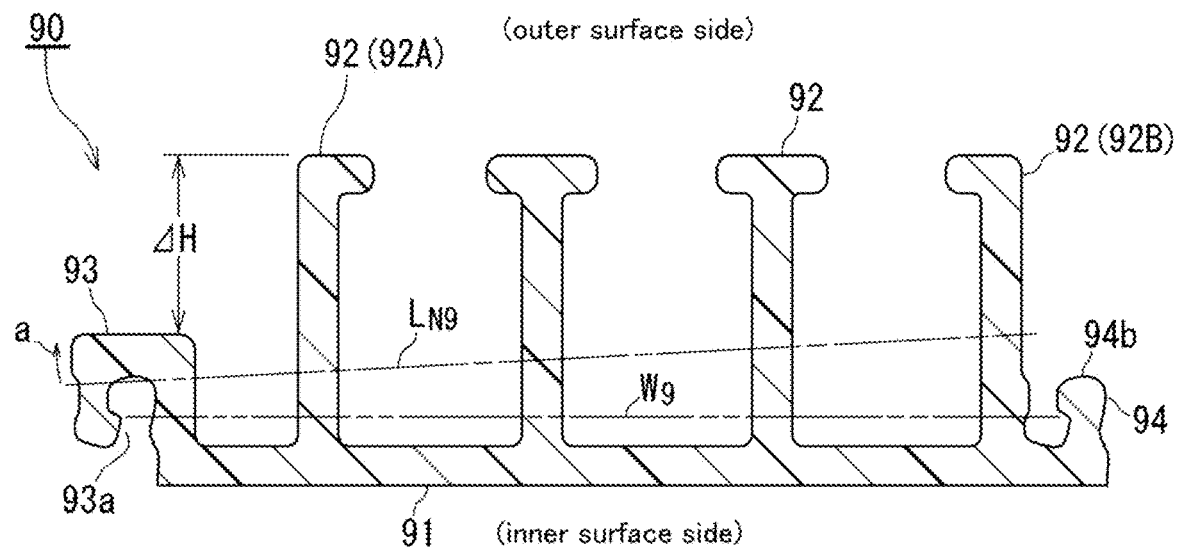
FIG. 3 (a) is a cross-sectional view taken along line III-III of FIG. 1, showing the strip member in a non-curved state.

A direction connecting the first fitting portion 93 and the second fitting portion 94 on the cross-section orthogonal to the extending direction of the strip member 90 is referred to as a reference width direction $W_9$. Specifically, the reference width direction $W_9$ is a direction connecting a particular position of the first fitting portion 93 and a position of the second fitting portion 94 corresponding to the particular position. As shown in FIG. 3(a), in a state that the strip member 90 extends straight, the reference width direction $W_9$ extends substantially parallel to a width direction of the flat inner surface (under surface in FIG. 3(a)) of the flat strip portion 91.

As shown in FIG. 1, a cross-section of the spiral pipe 9 orthogonal to the extending direction of the strip member 90 intersects with a plane through a pipe axis $L_9$ of the spiral pipe 9 at an angle corresponding to a lead angle $\alpha_9$ of the strip member 90 in a precise sense. However, since the lead angle $\alpha_9$ is usually small ($\alpha_9=10°$ or less, for example), the cross-section orthogonal to the extending direction of the strip member 90 can be regarded as substantially on the plane through the pipe axis $L_9$. The reference width direction $W_9$ on the cross-section can also be regarded as substantially on the plane through the pipe axis $L_9$.

As shown in FIG. 3(a), in the strip member 90, a neutral weak axis $L_{N9}$ is inclined to the inner surface side (lower side in FIG. 3(a)) with respect to the reference width direction $W_9$ toward the first fitting portion 93 side due to the uneven distribution of the ribs 92 mentioned above, etc.

On the other hand, if the ribs 92 were evenly distributed, the neutral weak axis $L_{N9}$ would be inclined to the outer surface side with respect to the reference width direction $W_9$ toward the first fitting portion 93 side because of the difference between the volume of the first fitting portion 93 and the volume of the second fitting portion 94 mentioned above.

Figure 3B:
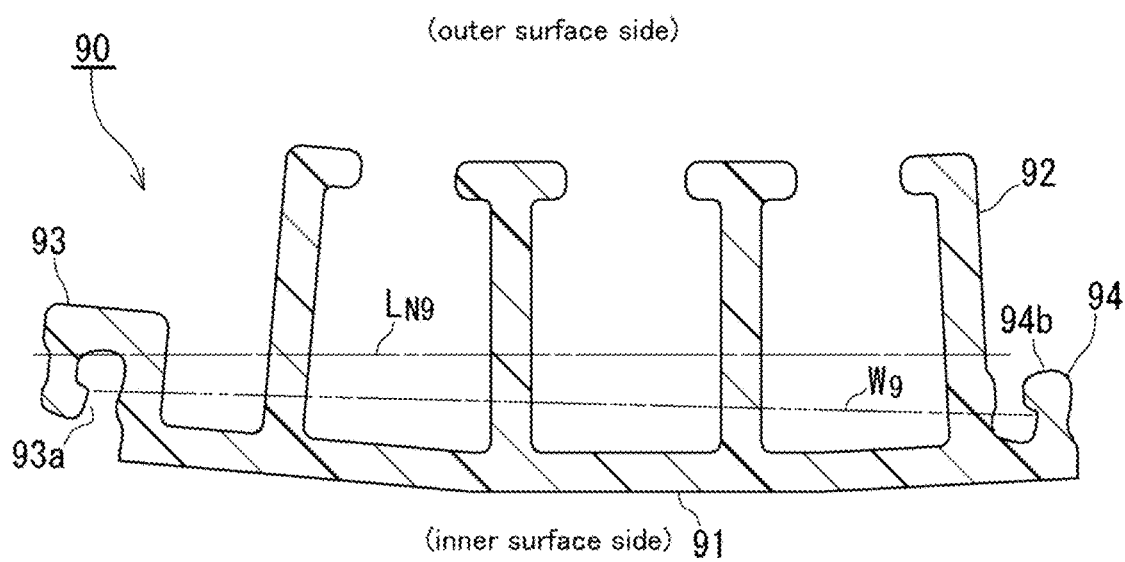

As indicated by a directional line a of FIG. 3(a), when the strip member 90 is wound into the spiral pipe 9, the neutral weak axis $L_{N9}$ is moved to be parallel to the pipe axis $L_9$ of the spiral pipe 9 (left-right horizontal direction in FIG. 3(a)). Thereby, as shown in FIG. 3(b), the reference width direction $W_9$ is inclined to the outer surface side with respect to the pipe axis $L_9$ toward the first fitting portion 93 side (refer to Example 1 to be described later).

It means that a cross-sectional configuration of the strip member 90 is such that when the strip member 90 is wound, the reference width direction $W_9$ is inclined to the outer surface side toward the first fitting portion 93 side. In other words, the cross-sectional configuration of the strip member 90 is such that when the strip member 90 is wound, the first fitting portion 93 is moved to the outer surface side (outer side in the radial direction of the spiral pipe 9) with respect to the second fitting portion 94.

To put it in another way, it is preferable to design and manufacture the strip member 90 such that the strip member 90 has the cross-sectional configuration as mentioned above according to a curvature of the spiral pipe 9 to be formed.

As a result, the cross-sectional configuration of the spiral pipe 90 can provide the spiral pipe 9 with a diameter enlarging property (perimeter enlarging property). That is, the diameter (perimeter) of the pipe can be enlarged as the pipe-making proceeds.

As shown in FIGS. 1 and 5, when the strip member 90 is lined around an inner periphery of the existing pipe 1 (outer periphery limiter), the spiral pipe 9 can be pressed against an inner peripheral surface of the existing pipe 1 by the diameter enlarging property. In other words, the spiral pipe 9 is formed along the inner peripheral surface of the existing pipe 1. Thereby, a flow passage cross-sectional area of the spiral pipe 9 can be secured as large as possible and a reduction in a flow passage cross-sectional area of the existing pipe 1 after the rehabilitation can be constrained.

Furthermore, as shown in FIG. 1, even if the existing pipe 1 has the cross-section changed portion 1d, a pipe-making diameter of the spiral pipe 9 can be adjusted to accommodate the change in the cross-section.

Figure 6:
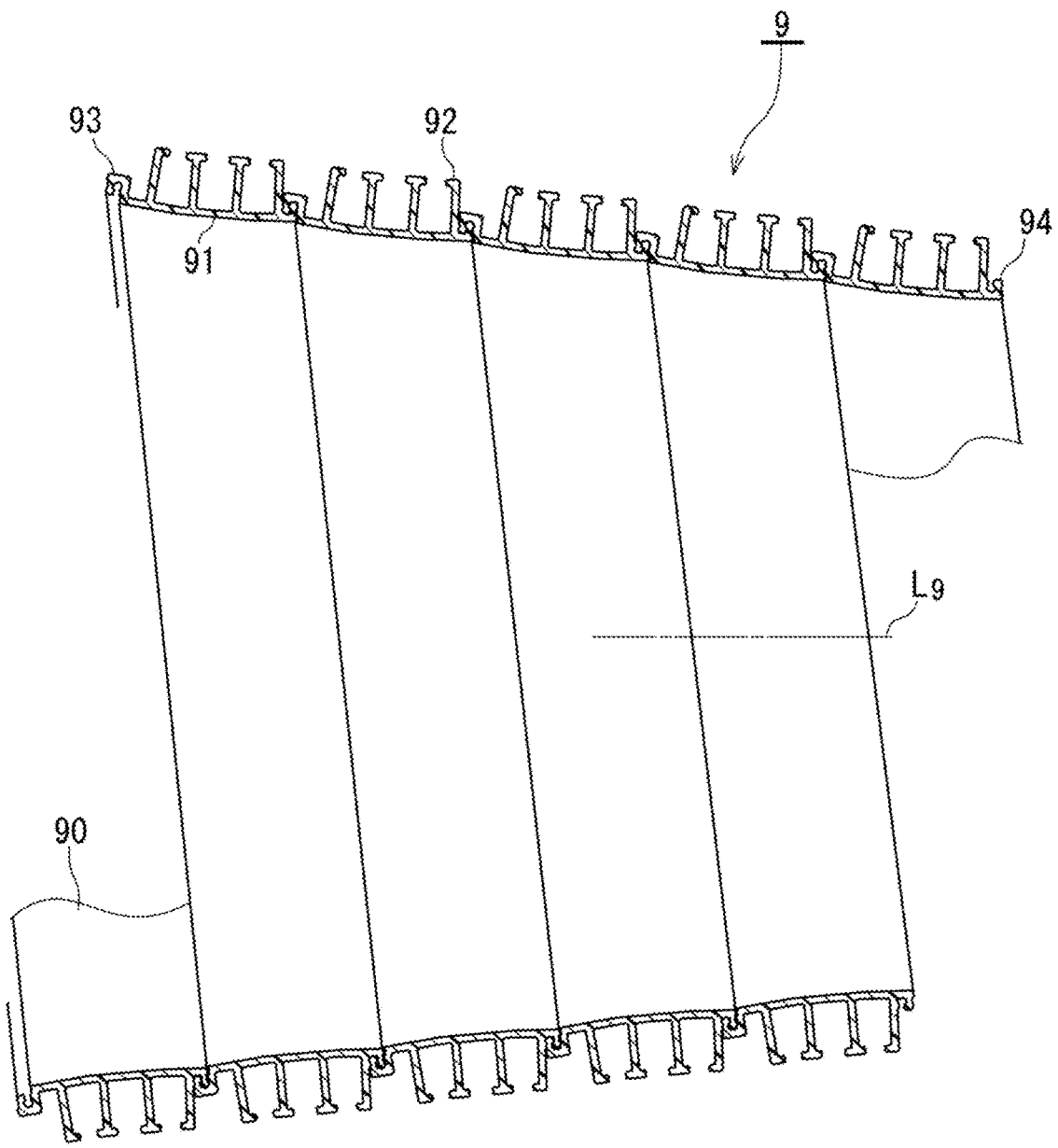
FIG. 6 is a cross-sectional view of a spiral pipe made from the strip member without an outer periphery limiter.

As shown in FIG. 6, if there is no outer periphery limiter such as the existing pipe, the diameter of the spiral pipe 9 can be enlarged in a tapered configuration as the pipe-making proceeds.

The taper angle shown in FIG. 6 is exaggerated.

Other embodiments of the present invention will be described hereinafter. In the description of these embodiments, same reference numerals will be used to indicate features same as those of foregoing embodiments, and explanation thereof will be omitted.

Second Embodiment

Figure 7:
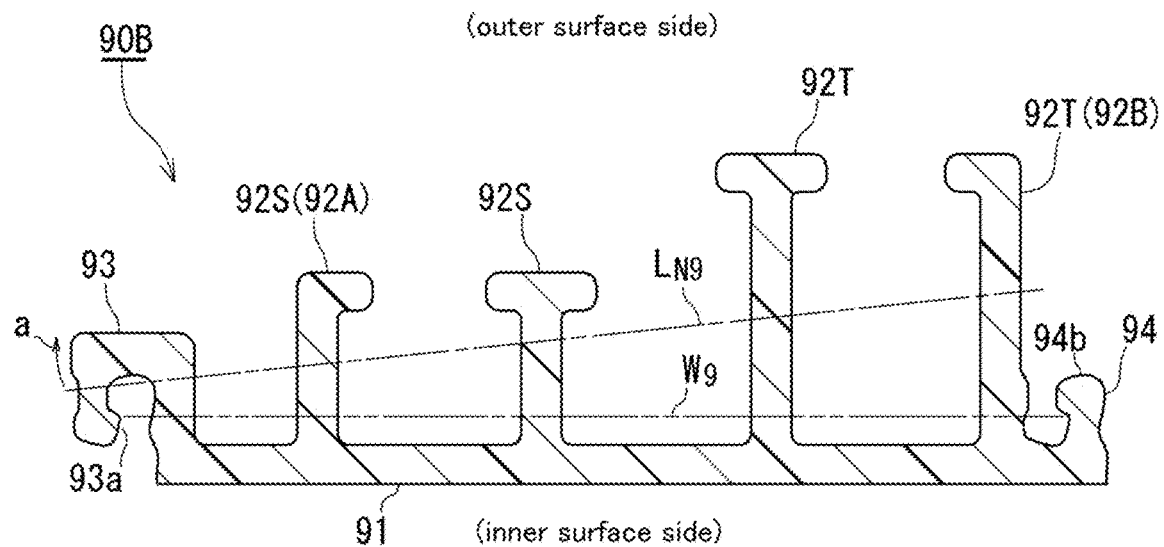
FIG. 7 is a cross-sectional view of a strip member according to a second embodiment of the present invention, shown in a non-curved state.

FIG. 7 shows a second embodiment of the present invention.

In a strip member 90B of the second embodiment, a protruded height of ribs 92S, 92T from a flat strip portion 91 vary according to positions thereof in a width direction of the flat strip portion 91. The ribs 92S on a first fitting portion side are relatively low and the ribs 92T on a second fitting portion 94 side are relatively high.

Therefore, a difference in cross-sectional areas per unit width between the first fitting portion 93 side and the second fitting portion 94 side of the strip member 90B is greater than that of the first embodiment (FIG. 3). That is, the cross-sectional area of the strip member 90B per unit width is further smaller on the first fitting portion 93 side.

Thereby, a neutral weak axis $L_{N9}$ can be inclined more to an inner surface side with respect to a reference width direction $W_9$ toward the first fitting portion 93 side. Further, when the strip member 90B is wound, the neutral weak axis $L_{N9}$ is moved to be parallel to a pipe axis $L_9$ (left-right horizontal direction in FIG. 7), and thereby, the reference width direction $W_9$ can be inclined more to an outer surface side toward the first fitting portion 93 side. As a result, the

Third Embodiment

Figure 8:
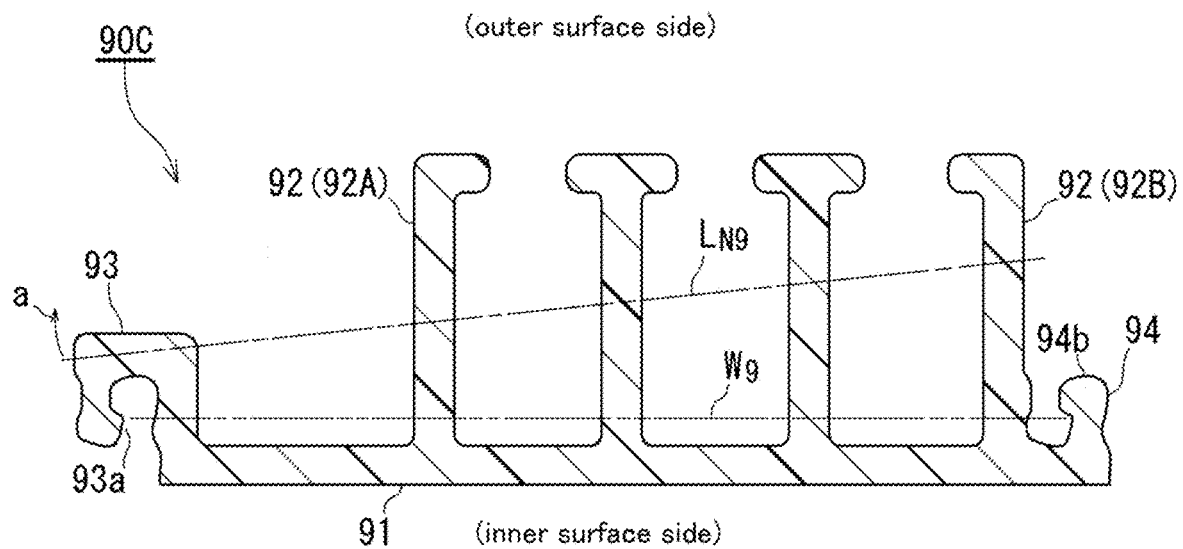
FIG. 8 is a cross-sectional view of a strip member according to a third embodiment of the present invention, shown in a non-curved state.

FIG. 8 shows a third embodiment of the present invention.

In a strip member 90C of the third embodiment, a plurality of ribs 92 are disposed more heavily on a second fitting portion 94 side compared with the first embodiment (FIG. 3). The ribs 92 are relatively sparsely disposed on a first fitting portion 93 side and relatively densely disposed on the second fitting portion 94 side. Specifically, distances between the ribs 92 are shorter than those of the first embodiment (FIG. 3). And, a distance between the first fitting portion 93 and a nearest rib 92A is longer than that of the first embodiment (FIG. 3).

Therefore, a difference between a cross-sectional area per unit width on the first fitting portion 93 side of the strip member 90C and a cross-sectional area per unit width on the second fitting portion 94 side of the strip member 90C is greater than that of the first embodiment (FIG. 3). That is, the cross-sectional area of the strip member 90C per unit width is further smaller on the first fitting portion 93 side.

Thereby, a neutral weak axis $L_{N9}$ can be inclined more to an inner surface side with respect to a reference width direction $W_9$ toward the first fitting portion 93 side. Further, when the strip member 90C is wound, the neutral weak axis $L_{N9}$ is moved to be parallel to a pipe axis $L_9$ (left-right horizontal direction in FIG. 8), and thereby, the reference width direction $W_9$ can be inclined more to an outer surface side toward the first fitting portion 93 side. As a result, the spiral pipe 9 can be surely provided with a diameter enlarging property (perimeter enlarging property).

Fourth Embodiment

Figure 9:
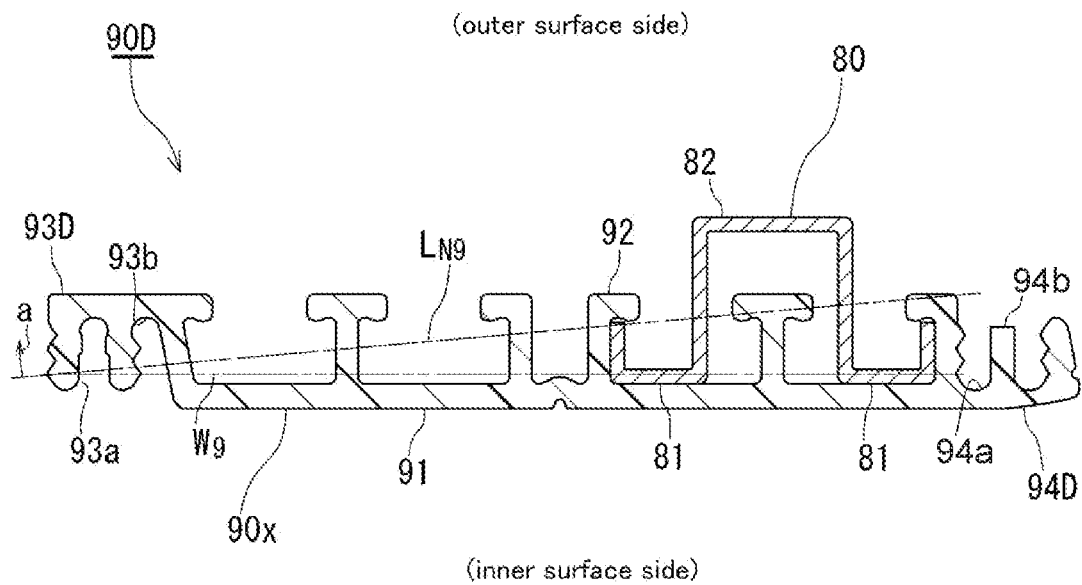
FIG. 9 is a cross-sectional view of a strip member according to a fourth embodiment of the present invention, shown in a non-curved state.

FIG. 9 shows a fourth embodiment of the present invention.

A strip member 90D according to the fourth embodiment has a strip body 90x and a cross-section adjustment member 80. The strip body 90x is made of a synthetic resin such as polyvinyl chloride as with the strip member 90 of the first embodiment (FIG. 3). The strip body 90x includes a flat strip portion 91, ribs 92, a first fitting portion 93D and a second fitting portion 94D. The strip body 90x extends in a direction orthogonal to the plane of FIG. 9.

The first fitting portion 93D has a fitting groove 93a and a fitting protrusion 93b. The fitting groove 93a is open to an inner surface side of the strip member 90D. The fitting protrusion 93b is protruded to the inner surface side of the strip member 90D.

The second fitting portion 94D has a fitting protrusion 94b and a fitting groove 94a. The fitting protrusion 94b is protruded to an outer surface side of the strip member 90D. The fitting groove 94a is open to the outer surface side of the strip member 90D.

The cross-section adjustment member 80 is disposed in a portion of the strip body 90x closer to the second fitting portion 94D side than a center of the strip body 90x in a width direction. The cross-section adjustment member 80 has a constant cross-section and has a configuration of a strip extending parallel to the strip body 90x. Specifically, the cross-section adjustment member 80 integrally includes a pair of anchoring portions 81, 81 having a L-shaped cross-section and a protruded portion 82 having a Π-shaped cross-section. The anchoring portion 81 is abutted against an outer surface of the flat strip portion 91 and caught by the ribs 92. The protruded portion 82 is laid between the pair of anchoring portions 81, 81 and protruded toward the outer surface. A cross-sectional configuration of the cross-section adjustment member 80 is symmetric with respect to a center line of the cross-section adjustment member 80 in a width direction.

A material of the cross-section adjustment member 80 may be a resin such as polyvinyl chloride as with the strip body 90x or may be a metal such as steel, iron or aluminum. If the cross-section adjustment member 80 is made of the same resin as the strip body 90x, analysis or the like of a neutral weak axis $L_{N9}$ of the strip member 90D as a whole can be done easily. If the cross-section adjustment member 80 is made of a metal having a higher stiffness than the strip body 90x, the cross-section adjustment member 80 can also serve as a reinforcement member.

According to the fourth embodiment, a cross-sectional configuration of the entire strip member 90D can be adjusted by the cross-section adjustment member 80, and a degree of enlargement of diameter (degree of enlargement of perimeter) can be controlled.

Specifically, a neutral weak axis of the strip body 90x alone, i.e., the neutral weak axis of the strip member 90D without the cross-section adjustment member 80 would be inclined to the outer surface side toward the first fitting portion 93D side. Therefore, if a pipe were made by the strip body 90x alone, the spiral pipe 9 would be reduced in diameter (reduced in perimeter).

On the other hand, in the fourth embodiment, by the addition of the cross-section adjustment member 80, the neutral weak axis $L_{N9}$ of the entire strip member 90D is inclined to an inner surface side with respect to a reference width direction $W_9$ toward the first fitting portion 93 side. Therefore, when a curvature is applied to the strip member 90D, as indicated by a directional line a in FIG. 9, the neutral weak axis $L_{N9}$ is moved to be parallel to a pipe axis $L_9$, and thereby, the reference width direction $W_9$ can be made to be inclined to the outer surface side toward the first fitting portion 93 side. Thereby, the cross-sectional configuration of the strip member 90 can be made to be enlarged in diameter (enlarged in perimeter) as the pipe-making proceeds, and the spiral pipe 9 can be provided with a diameter enlarging property (perimeter enlarging property).

Fifth Embodiment

Figure 10:
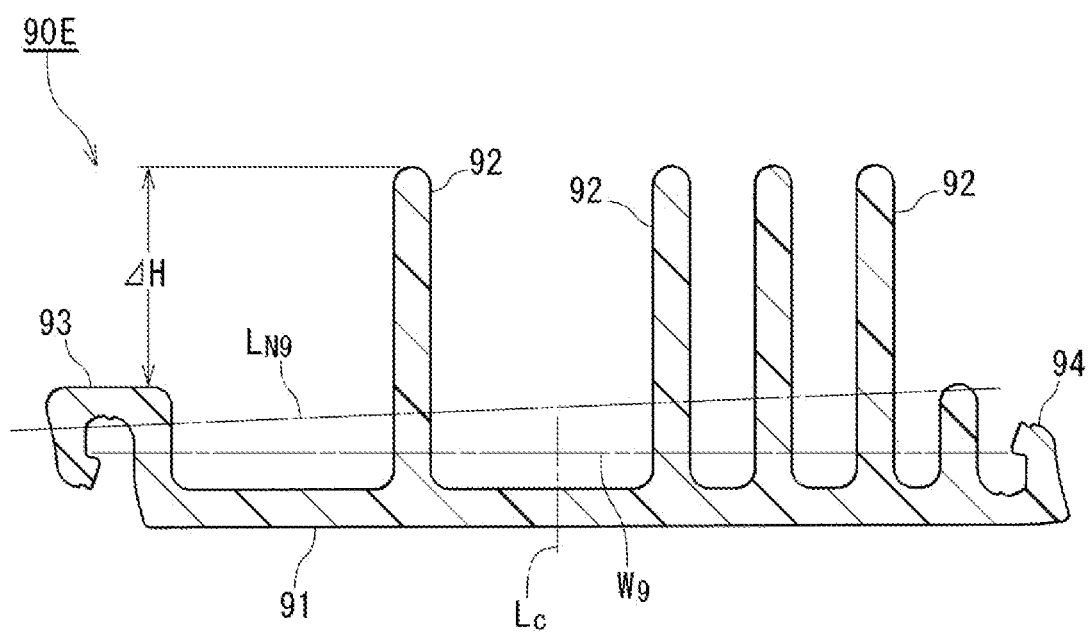
FIG. 10 is a cross-sectional view of a strip member according to a fifth embodiment of the present invention, shown in a non-curved state.

FIG. 10 shows a fifth embodiment of the present invention.

In a strip member 90E of the fifth embodiment, a plurality (four in FIG. 10) of ribs 92 are generally disposed more heavily on a second fitting portion 94 side (right side in FIG. 10). In other words, the ribs 92 are relatively sparsely disposed on a first fitting portion 93 side and relatively densely disposed on the second fitting portion 94 side. Specifically, the number of ribs 92 on the first fitting portion 93 side (left side in FIG. 10) with respect to a center line Lc in a width direction of the strip member 90E is one and the number of ribs 92 on the second fitting portion 94 side (right side in FIG. 10) is three. Therefore, a cross-sectional area of the strip member 90E per unit width on the first fitting portion 93 side is relatively small and a cross-sectional area per unit width on the second fitting portion 94 side is relatively large.

Thereby, a neutral weak axis $L_{N9}$ of the strip member 90E is inclined to an inner surface side with respect to a reference width direction $W_9$ toward the first fitting portion 93 side.

Therefore, the strip member 90E can be provided with a diameter enlarging property (perimeter enlarging property) at the time of pipe-making.

Each of the ribs 92 of the strip member 90E has a flat plate configuration without a flange. Protruded heights of the plurality of ribs 92 are equal to one another.

Sixth Embodiment

Figure 11:
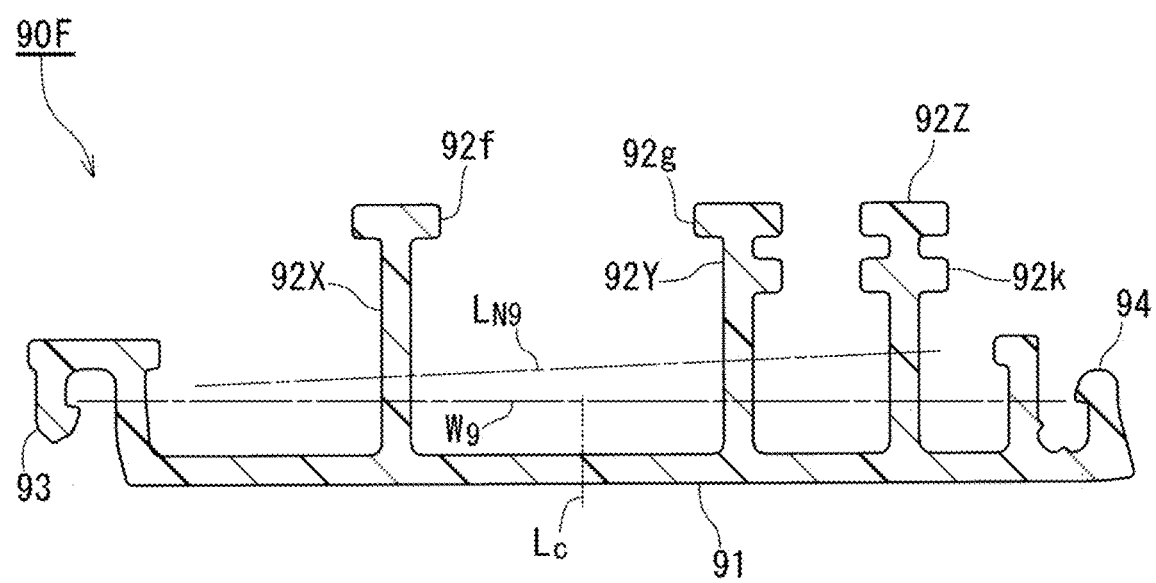
FIG. 11 is a cross-sectional view of a strip member according to a sixth embodiment of the present invention, shown in a non-curved state.

FIG. 11 shows a sixth embodiment of the present invention.

In a strip member 90F of the sixth embodiment, the number (one) of ribs 92X on a first fitting portion 93 side (left side in FIG. 11) with respect to a center line Lc in a width direction of the strip member 90F is smaller than the number (two) of ribs 92Y, 92Z on a second fitting portion 94 side (right side in FIG. 11). Therefore, the ribs 92X, 92Y, 92Z are relatively sparsely disposed on the first fitting portion 93 side and relatively densely disposed on the second fitting portion 94 side.

A single flange 92f is formed in a distal end portion (upper end in FIG. 11) of the rib 92X on the first fitting portion 23 side. The rib 92X has a generally T-shaped cross-sectional configuration.

Double flanges 92g, 92k are formed in respective distal end portions of the ribs 92Y, 92Z on the second fitting portion 94 side with respect to the center line Lc. The double flange 92k of the rib 92Z closest to the second fitting portion 94 is a double bilateral flange protruded to opposite sides of the rib 92Z. In the double flange 92g of the intermediate rib 92Y, an upper flange (upper end in FIG. 11) is a bilateral flange and a lower flange is a unilateral flange protruded to the rib 92z side (right side in FIG. 11) only. Therefore, a cross-sectional area of the strip member 90F per unit width on the first fitting portion 93 side (left side in FIG. 11) is relatively small and a cross-sectional area of the strip member 90F per unit width on the second fitting portion 94 side is relatively large.

Thereby, a neutral weak axis $L_{N9}$ of the strip member 90F is inclined to an inner surface side with respect to a reference width direction $W_9$ toward the first fitting portion 93 side. Therefore, the strip member 90E can be provided with a diameter enlarging property (perimeter enlarging property) at the time of pipe-making.

The present invention is not limited to the embodiments described above. Various modifications can be made without departing from the spirit of the invention.

For example, the strip member 90 and the strip body 90x may be made of a metal such as steel. A spiral pipe 9 made of metal may be made.

The number of the cross-section adjustment member 80 (FIG. 9) is not limited to one, but may be two or more. Location or distribution of the cross-section adjustment member 80 may be adjusted as appropriate.

The cross-section adjustment member may be mountable/dismountable (attachable/removable).

A heat collecting pipe for obtaining heat from flowing water such as sewage may be also used as the cross-section adjustment member.

The pipe-making apparatus 3 is not limited to the self-propelled pipe-making apparatus (Patent Document 3, etc.). A pipe-making apparatus adopting a back-pushing method or a towing method may be used (Refer to Patent Document 1, etc.).

Application of the strip member, and further the spiral pipe of the present invention is not limited to a rehabilitation pipe for an existing sewer pipe. The strip member may be used as a rehabilitation pipe for a water supply pipe, a water conduit for hydroelectric power generation and an agricultural water pipe. Furthermore, application of the strip member is not limited to a rehabilitation pipe, but may be used for various spiral pipes.

Depending on the usage of the spiral pipe, it is not required that the inner surface (under surface in FIG. 3) of the flat strip portion 91 should be flat. The ribs 92 may be disposed on the inner surface side of the flat strip portion 91.

EXAMPLE 1

Examples are described hereinafter. The present invention is not limited to the examples given below.

The neutral weak axis $L_{N9}$ and a centroid position or the like of the strip member 90 having the cross-sectional configuration shown in FIG. 3(a) were analyzed by computer. As a mode of analysis, a finite element method was used.

A width dimension of the strip member 90 was 100 mm.

A height difference ΔH between the first fitting portion 93 and the ribs 92 was 20.0 mm.

Physical property values such as an elastic coefficient were set presuming that a material of the strip member 90 was polyvinyl chloride.

As a result of the analysis, it was confirmed that the neutral weak axis $L_{N9}$ of the strip member 90 was inclined to the inner surface side (downward in FIG. 3(a)) through 1.46 degrees with respect to the reference width direction $W_9$ toward the first fitting portion 93 side (leftward in FIG. 3(a)).

The centroid position was shifted from the center line Lc of the strip member 90 in the width direction to the second fitting portion 94 side (rightward in FIG. 3(a)) by 2.06 mm.

A proportion of a cross-sectional area A1, and further an amount of resin of the strip member 90 on the first fitting portion 93 side (left side in FIG. 3(a)) with respect to the center line Lc to a cross-sectional area A2, and further an amount of resin of the strip member 90 on the second fitting portion 94 side (right side in FIG. 3(a)) was A1/A2=1.11.

Subsequently, a change in a cross-sectional configuration of the strip member 90 when being bent in the extending direction was analyzed by the finite element method.

A radius of curvature of the bending was 1500 mm in the inner peripheral surface of the spiral pipe 9.

FIG. 3(b) shows a cross-sectional configuration as a result of the analysis. When the neutral weak axis $L_{N9}$ was oriented parallel (left-right direction in FIG. 3(b)) to the pipe axis $L_9$, the reference width direction $W_9$ was inclined to the outer surface side toward the first fitting portion 93 side.

Thus, it was confirmed that if made into a spiral pipe 9, the cross-section can be enlarged in diameter (enlarged in perimeter).

EXAMPLE 2

In Example 2, a spiral pipe was made using a strip member with a cross-section adjustment member (refer to the fourth embodiment). However, not like the fourth embodiment (FIG. 9), the cross-section adjustment member 80 was disposed on a first fitting portion 93D side with respect to a center in a width direction of a strip body 90x. Moreover, a protruded portion 82 of the cross-section adjustment member 80 was deformed to be inclined to the first fitting portion 93D side toward the outer surface.

A proportion of a height dimension (corresponding to a vertical direction in FIG. 9) of the cross-section adjustment member 80 to a width dimension was generally 1 to 1.

A thickness of the cross-section adjustment member 80 was 1.2 mm.

A material of the cross-section adjustment member 80 was steel.

A material of the strip body 90x was polyvinyl chloride.

A width direction of the strip body 90x was 100 mm.

Indicators showing remaining lengths are printed on an inner peripheral surface of the strip member 90 at an interval of 1000 mm.

A radius of curvature of the spiral pipe 9 was set at 470 mm in an inner peripheral surface of the spiral pipe 9.

Pipe-making was performed without an outer periphery limiter or an inner periphery limiter.

Figure 12:
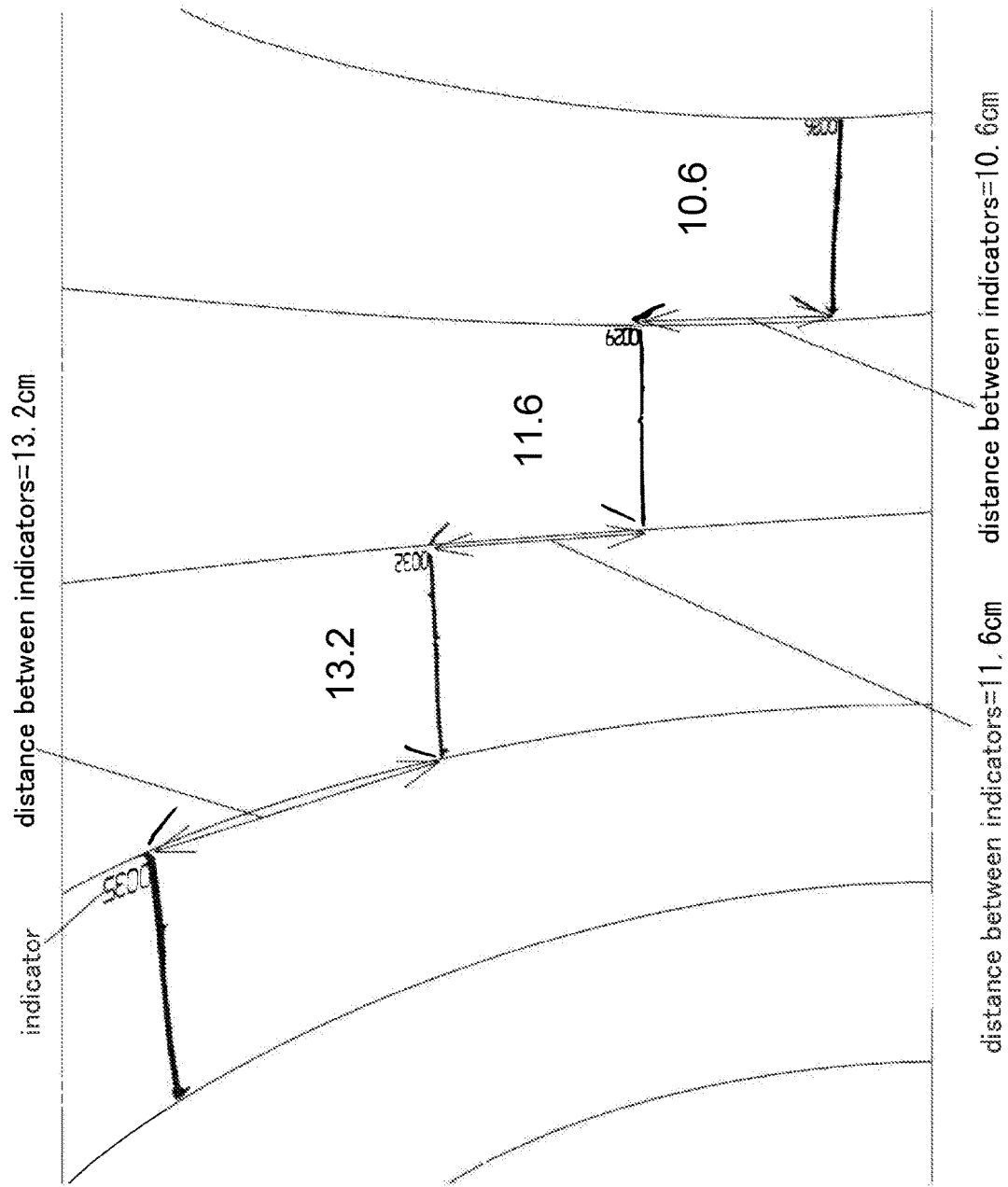
FIG. 12 is a sketch showing results of Example 2.

As shown in FIG. 12, distances between adjacent indicators were gradually reduced as the pipe-making proceeds (rightward direction in FIG. 12), such as from 13.2 cm to 11.6 cm and to 10.6 cm, for example. This confirmed that the perimeter was increased by every turn and the diameter of the spiral pipe 9 was enlarged.

EXAMPLE 3

In Example 3, the neutral weak axis $L_{N9}$ and a centroid position or the like of the strip member 90E shown in FIG. 10 were analyzed by computer in a similar manner to the Example 1.

A width dimension of the strip member 90E was 100 mm.

A height difference ΔH between the first fitting portion 93 and the ribs 92 of the strip member 90E was 22.0 mm.

Physical property values such as an elastic coefficient were set presuming that a material of the strip member 90E was polyvinyl chloride.

As a result of the analysis, the neutral weak axis $L_{N9}$ of the strip member 90E was inclined to the inner surface side (downward in FIG. 10) through 2.63 degrees with respect to the reference width direction $W_9$ toward the first fitting portion 93 side (leftward in FIG. 10), and it was confirmed that the strip member 90E has a diameter enlarging property (perimeter enlarging property).

The centroid position was shifted from the center line Lc of the strip member 90E in the width direction to the second fitting portion 94 side (right side in FIG. 10) by 6.51 mm.

A proportion of a cross-sectional area A1, and further an amount of resin of the strip member 90E on the first fitting portion 93 side (left side in FIG. 10) with respect to the center line Lc to a cross-sectional area A2, and further an amount of resin of the strip member 90E on the second fitting portion 94 side (right side in FIG. 10) was A1/A2=0.61.

Comparative Example 1

Figure 13:
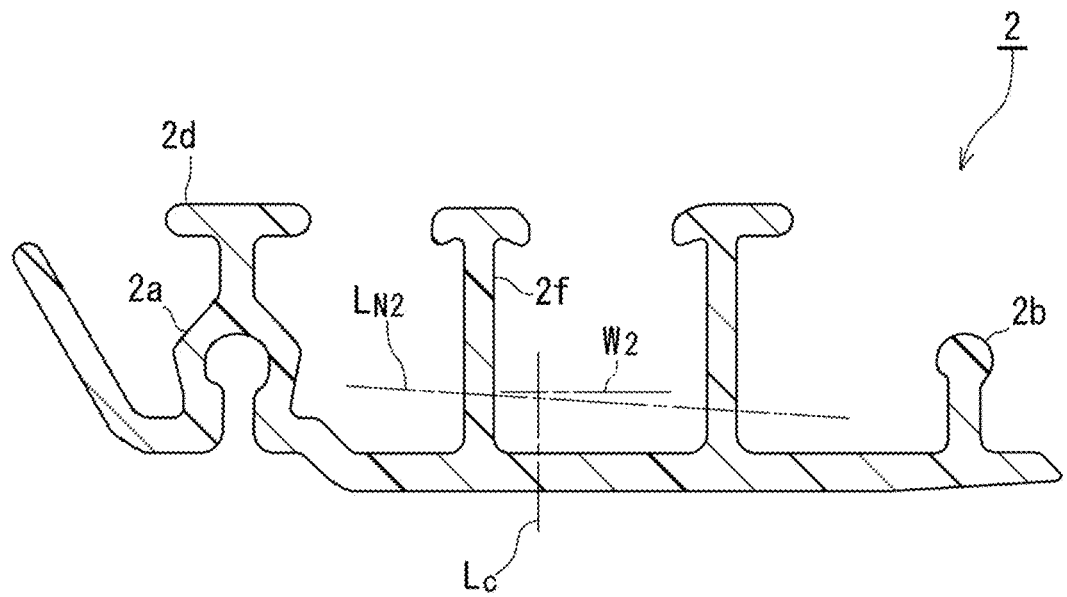
FIG. 13 is a cross-sectional view of a known strip member used in Comparative Example 1.

In Comparative Example 1, a neutral weak axis $L_{N2}$ or the like of a strip member 2 having a known cross-sectional configuration (approximate to FIG. 1 of Japanese Patent Application Publication No. 2000-96996) as shown in FIG. 13 were analyzed by computer in a similar manner to the Examples 1 and 3.

A width dimension of the strip member 2 was 100 mm.

A height difference between a rib 2d on a first fitting portion 2a of the strip member 2 and the other ribs 2f was 0 mm.

Physical property values such as an elastic coefficient were set presuming that a material of the strip member 2 was polyvinyl chloride.

As a result of the analysis, the neutral weak axis $L_{N2}$ of the strip member 2 was inclined to an outer surface side (upward in FIG. 13) through 6.26 degrees with respect to a reference width direction $W_2$ toward the first fitting portion 2a side (leftward in FIG. 13). Therefore, it was confirmed that a diameter is reduced (perimeter is reduced) as the pipe-making proceeds in the strip member 2.

A centroid position was shifted from a center line Lc of the strip member 2 in the width direction to the first fitting portion 2a side (leftward in FIG. 13) by 2.91 mm.

A proportion of a cross-sectional area A1, and further an amount of resin of the strip member 2 on the first fitting portion 2a side (left side in FIG. 13) with respect to a center line Lc to a cross-sectional area A2, and further an amount of resin of the strip member 2 on a second fitting portion 2b side (right side in FIG. 13) was A1/A2=1.35.

Comparative Example 2

Figure 14:
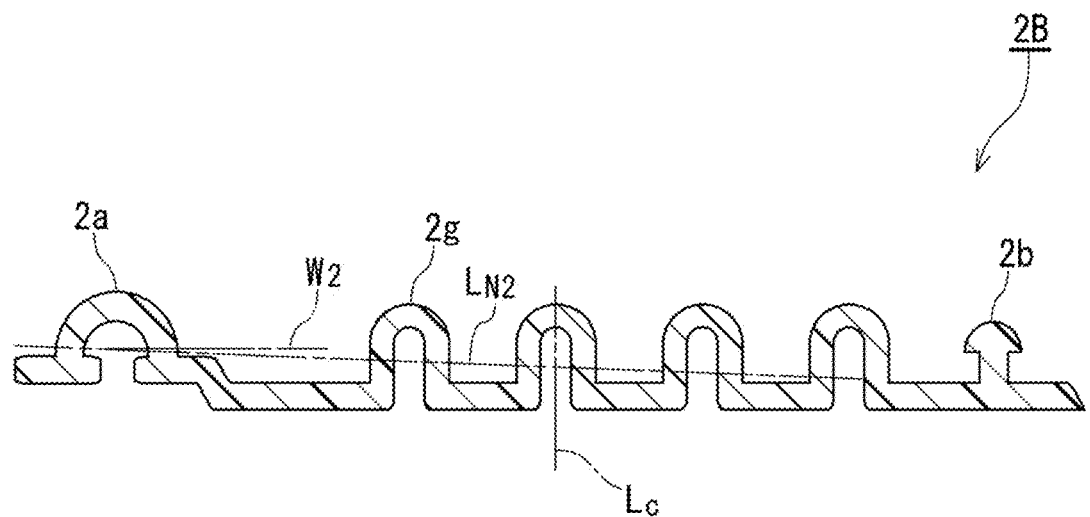
FIG. 14 is a cross-sectional view of a known strip member used in Comparative Example 2.

In Comparative Example 2, a neutral weak axis $L_{N2}$ or the like of a strip member 2B having a known cross-sectional configuration (FIG. 1 of Japanese Patent Application Publication No. H06-143420) as shown in FIG. 14 were analyzed by computer in a similar manner to the Examples 1 and 3.

A width dimension of the strip member 2B was 100 mm.

A height difference between a first fitting portion 2a of the strip member 2B and ribs 2g having a U-shaped configuration was 0 mm.

Physical property values such as an elastic coefficient were set presuming that a material of the strip member 2B was polyvinyl chloride.

As a result of the analysis, the neutral weak axis $L_{N2}$ of the strip member 2B was inclined to an outer surface side (upward in FIG. 14) through 1.284 degrees with respect to a reference width direction $W_2$ toward the first fitting portion 2a side (leftward in FIG. 14). Therefore, it was confirmed that a diameter is reduced (perimeter is reduced) as the pipe-making proceeds in the strip member 2B.

A centroid position was shifted from a center line Lc of the strip member 2B in the width direction to a second fitting portion 2b side (rightward in FIG. 14) by 0.16 mm.

A proportion of a cross-sectional area A1, and further an amount of resin of the strip member 2B on the first fitting portion 2a side (left side in FIG. 14) with respect to a center line Lc to a cross-sectional area A2, and further an amount of resin of the strip member 2B on the second fitting portion 2b side (right side in FIG. 14) was A1/A2=0.93.

INDUSTRIAL APPLICABILITY

The present invention can be applied to a rehabilitation work of an aged sewage pipe, for example.

EXPLANATION OF REFERENCE NUMERALS 1 existing pipe
1d cross-section varying portion
3 pipe-making apparatus
9 spiral pipe (rehabilitation pipe)
80 cross-section adjustment member
81 anchoring portion
82 protruded portion
90 strip member 90B to 90F strip member
90x strip body
91 flat strip portion
92 rib
92A, 92B, 92S, 92T, 92X to 92Z rib
93 first fitting portion
93D first fitting portion
93a fitting groove
93b fitting protrusion
94 second fitting portion
94D second fitting portion
94b fitting protrusion
94a fitting groove
a, b directional line
$L_9$ pipe axis
$L_{N9}$ neutral weak axis
$L_C$ center line
$W_9$ reference width direction

The invention claimed is:

1. A strip member configured to be spirally wound to form a spiral pipe, the strip member comprising:
a flat strip portion that is flat;
a first fitting portion disposed at one end portion of a cross-section orthogonal to an extending direction of the strip member, the first fitting portion integrally continuing to an end portion of the flat strip portion, wherein a fitting groove is formed in the first fitting portion, the fitting groove being open to an inner surface side of the strip member; and
a second fitting portion disposed at the other end portion of the cross-section, wherein the second fitting portion has a fitting protrusion which protrudes from the flat strip portion toward an outer surface side of the strip member, the fitting protrusion of the second fitting portion being configured to be fitted with the fitting groove of the first fitting portion preceding by one turn,
wherein the strip member has a neutral weak axis having a minimum moment of inertia of area, and a reference width direction extending between a first point on the fitting groove and a second point on the fitting protrusion, the first and second points being in contact with each other when the protrusion is fitted into the groove,
wherein in a non-curved state of the strip member, the reference width direction is parallel to the flat strip portion, and the neutral weak axis is inclined toward the fitting groove and toward the inner surface side relative to the reference width direction,
wherein when the strip member is spirally wound into the spiral pipe, the neutral weak axis becomes parallel to a pipe axis of the spiral pipe and the reference width direction becomes inclined toward the fitting groove and toward the outer surface side relative to the pipe axis such that a perimeter of the spiral pipe enlarges as the strip member is spirally wound,
wherein a cross-sectional area of the cross-section per unit width is relatively small at the one end portion having the fitting groove and is relatively large at the other end portion having the fitting protrusion.

2. The strip member according to claim 1, further comprising:
a plurality of ribs protruded from an outer side surface of the flat strip portion, the ribs being spaced from each other in a width direction of the flat strip portion, wherein
the first fitting portion is disposed at one end portion of the flat strip portion in the width direction and the second fitting portion is disposed at the other end portion thereof, and
the ribs are relatively sparsely disposed at the one end portion of the flat strip portion having the first fitting portion with the fitting groove, and are relatively densely disposed at the other end portion of the flat strip portion having the second fitting portion with the fitting protrusion, wherein a difference between the sparsely disposed ribs and the densely disposed ribs inclines the neutral weak axis toward the inner surface side in the non-curved state.

3. The strip member according to claim 1, further comprising:
a plurality of ribs protruded from an outer side surface of the flat strip portion, the ribs being spaced from each other in a width direction of the flat strip portion, wherein
the first fitting portion is disposed at one end portion of the flat strip portion in the width direction and the second fitting portion is disposed at the other end portion thereof, and
a protruded height of the ribs from the flat strip portion is relatively low at the one end portion of the flat strip portion having the first fitting portion with the fitting groove, and the protruded height of the ribs from the flat strip portion is relatively high at the other end portion of the flat strip portion having the second fitting portion with the fitting protrusion.

4. A rehabilitation method of an existing pipe, comprising spirally winding the strip member according to claim 1 to form a rehabilitation pipe along an inner surface of the existing pipe.

5. A strip member configured to be spirally wound to form a spiral pipe, the strip member comprising:
a strip body made of a synthetic resin, wherein the strip body includes:
a flat strip portion that is flat;
a first fitting portion disposed at one end portion of a cross-section orthogonal to an extending direction of the strip member, the first fitting portion integrally continuing to an end portion of the flat strip portion, wherein a fitting groove is formed in the first fitting portion, the fitting groove being open to an inner surface side of the strip member; and
a second fitting portion disposed at the other end portion of the cross-section, wherein the second fitting portion has a fitting protrusion which protrudes from the flat strip portion toward an outer surface side of the strip member, the fitting protrusion of the second fitting portion being configured to be fitted with the fitting groove of the first fitting portion preceding by one turn,
wherein the strip member has a reference width direction extending between a first point on the fitting groove and a second point on the fitting protrusion, the first and second points being in contact with each other when the protrusion is fitted into the groove; and
a cross-section adjustment member, wherein the cross-section adjustment member includes:
a pair of anchoring portions caught by the strip body; and
a protruded portion laid between the pair of anchoring portions and which protrudes toward the outer surface side, wherein in a non-curved state of the strip member, the reference width direction is parallel to the flat strip portion, and a neutral weak axis having a minimum moment of inertia of area of the strip body is inclined toward the fitting groove and toward the outer surface side relative to the reference width direction, and a neutral weak axis having a minimum moment of inertia of an entirety of the strip member is inclined toward the fitting groove and toward the inner surface side relative to the reference width direction, and wherein when the strip member is spirally wound into the spiral pipe, the neutral weak axis of the entirety of the strip member becomes parallel to a pipe axis of the spiral pipe and the reference width direction becomes inclined toward the fitting groove and toward the outer surface side relative to the pipe axis such that a perimeter of the spiral pipe enlarges as the strip member is spirally wound.

6. The strip member according to claim 5, wherein the cross-section adjustment member is a reinforcement strip material made of steel.

7. A rehabilitation method of an existing pipe, comprising spirally winding the strip member according to claim 5 to form a rehabilitation pipe along an inner surface of the existing pipe.

* * * * *